United States Patent
Deng et al.

(10) Patent No.: US 11,787,950 B2
(45) Date of Patent: Oct. 17, 2023

(54) MOLTEN ALUMINUM EROSION RESISTANT CASTING TIP PAINT AS WELL AS PREPARATION METHOD OF MOLTEN ALUMINUM EROSION RESISTANT CASTING TIP AND MOLTEN ALUMINUM EROSION RESISTANT CASTING TIP

(71) Applicant: WUHAN UNIVERSITY OF TECHNOLOGY, Hubei (CN)

(72) Inventors: Tengfei Deng, Wuhan (CN); Ji Shen, Wuhan (CN)

(73) Assignee: WUHAN UNIVERSITY OF TECHNOLOGY, Hubei (CN)

( * ) Notice: Subject to any disclaimer, the term of this patent is extended or adjusted under 35 U.S.C. 154(b) by 560 days.

(21) Appl. No.: 16/885,277

(22) Filed: May 28, 2020

(65) Prior Publication Data
US 2020/0377733 A1 Dec. 3, 2020

(30) Foreign Application Priority Data
May 28, 2019 (CN) .......................... 201910452266.2

(51) Int. Cl.
C09D 1/00 (2006.01)
C09D 4/00 (2006.01)
B22D 11/06 (2006.01)

(52) U.S. Cl.
CPC ................. C09D 1/00 (2013.01); C09D 4/00 (2013.01); *B22D 11/0642* (2013.01)

(58) Field of Classification Search
CPC .......... C09D 1/00; C09D 4/00; B22D 11/0642
See application file for complete search history.

(56) References Cited

FOREIGN PATENT DOCUMENTS

| CN | 105272198 | | 1/2016 | |
|----|-----------|---|--------|---|
| CN | 109133987 | A * | 1/2019 | ............ C04B 35/101 |
| EP | 0178155 | A2 * | 4/1986 | ............. C04B 35/66 |

OTHER PUBLICATIONS

English translation of CN-109133987.*

* cited by examiner

*Primary Examiner* — Robert S Walters, Jr.
(74) *Attorney, Agent, or Firm* — JCIP GLOBAL INC.

(57) ABSTRACT

The present disclosure discloses a molten aluminum erosion resistant casting tip paint, the casting tip paint is formed by mixing magnesia-alumina spinel, alumina, magnesia, water, sodium tripolyphosphate and sodium carboxymethyl cellulose, wherein the proportions of various raw materials for the casting tip paint are as follows: magnesia-alumina spinel of 40-50 wt %, alumina of 10-20 wt %, magnesia of 5-10 wt %, water of 20-40 wt %, sodium tripolyphosphate of 0-10 wt %, and sodium carboxymethyl cellulose of 0-10 wt %. The present disclosure also discloses a preparation method of a molten aluminum erosion resistant casting tip. The molten aluminum erosion resistant casting tip paint provided by the present disclosure can be evenly coated onto the inner wall of the casting tip, so as to form a compact molten aluminum erosion resistant coating, thereby preventing infiltration and erosion of the molten aluminum.

4 Claims, 1 Drawing Sheet

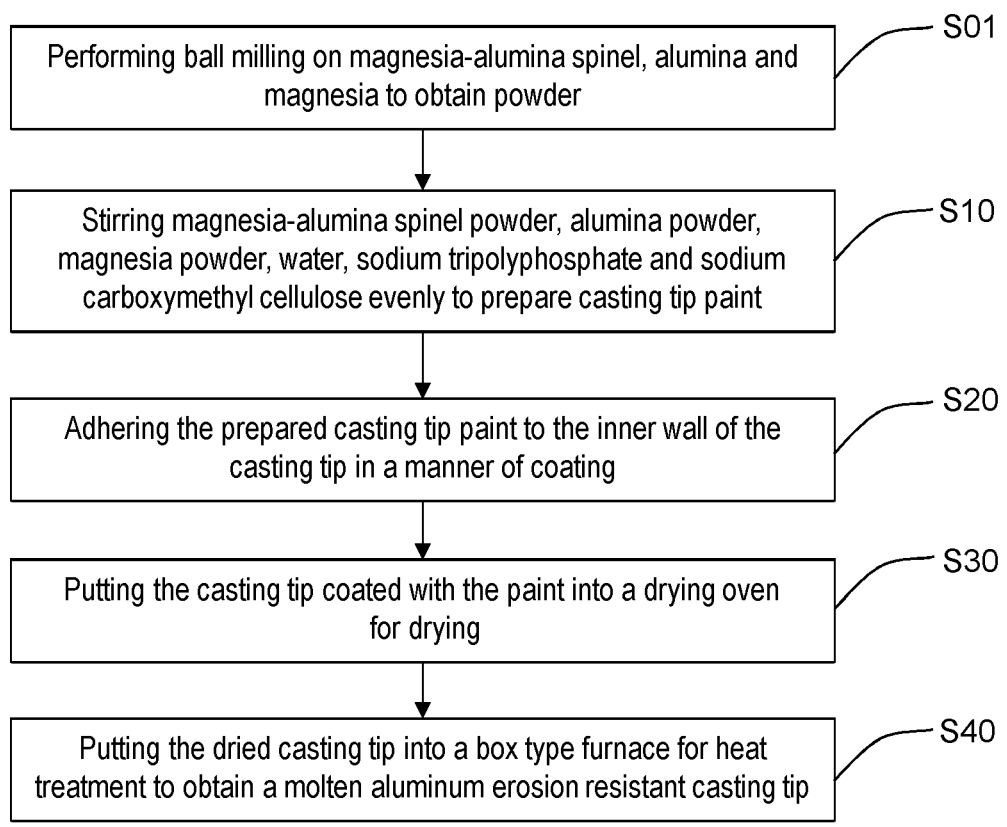

MOLTEN ALUMINUM EROSION RESISTANT CASTING TIP PAINT AS WELL AS PREPARATION METHOD OF MOLTEN ALUMINUM EROSION RESISTANT CASTING TIP AND MOLTEN ALUMINUM EROSION RESISTANT CASTING TIP

CROSS-REFERENCE TO RELATED APPLICATION

This application claims the priority benefit of China application serial no. 201910452266.2 filed on May 28, 2019. The entirety of the above-mentioned patent application is hereby incorporated by reference herein and made a part of this specification.

BACKGROUND

Technical Field

The present disclosure relates to the technical field of casting tip paint, and particularly relates to molten aluminum erosion resistant casting tip paint as well as a preparation method of a molten aluminum erosion resistant casting tip and a molten aluminum erosion resistant casting tip.

Description of Related Art

Aluminum continuous casting belongs to an aluminum thin slab molding technology with high efficiency, short process and low energy consumption, which is consistent with China's current policy of energy saving and emission reducing, green and environmental protection, and points out a way for China's aluminum plate and strip molding industry, thus having a very broad application prospect. A casting tip serves as a key part for directly feeding molten aluminum into a continuous casting machine, so that the material and structure of the casting tip are very important. The stability and useful life of the casting tip directly determine the continuity of production, and are very important to normal production, stabilization of various process parameters, and improvement of the quality of a casting-rolling slab.

At present, the casting tip of the aluminum continuous casting is generally made by using aluminosilicate fiber as a main raw material, adding a certain amount of binder, performing molding by a vacuum filtration molding method, and finally performing high temperature processing. The material of the casting tip should have an excellent thermal insulating property, high operation intensity, low unit weight and good thermal shock resistance. However, because the fiber has a porous structure, the casting tip is prone to be infiltrated and eroded by the molten aluminum during use, finally resulting in spalling, cracking, and even clogging of the casting tip, thereby influencing normal production and causing production disruption, thus it is required to replace the casting tip for recasting; this not only results in increased material cost of the casting tip, but also shortens the production time, and reduces the production efficiency, causing decline in economic benefits of the enterprise. Therefore, it is very necessary to perform erosion resistant coating treatment on the inner wall of the casting tip.

SUMMARY

The main purpose of the present disclosure is to provide molten aluminum erosion resistant casting tip paint as well as a preparation method of a molten aluminum erosion resistant casting tip and a molten aluminum erosion resistant casting tip, and the paint is intended to be evenly coated onto the inner wall of the casting tip, so as to form a compact molten aluminum erosion resistant coating, thereby preventing infiltration and erosion of the molten aluminum.

To achieve the above purpose, the present disclosure provides molten aluminum erosion resistant casting tip paint, which is formed by mixing magnesia-alumina spinel, alumina, magnesia, water, sodium tripolyphosphate and sodium carboxymethyl cellulose, wherein the proportions of various raw materials for the casting tip paint are as follows: magnesia-alumina spinel of 40-50 wt %, alumina of 10-20 wt %, magnesia of 5-10 wt %, water of 20-40 wt %, sodium tripolyphosphate of 0-10 wt %, and sodium carboxymethyl cellulose of 0-10 wt %.

Preferably, the particle size range of magnesia-alumina spinel is 10-100 nm, the particle size range of alumina is 10-100 nm, and the particle size range of magnesia is 10-100 nm.

The present disclosure further provides a preparation method of a molten aluminum erosion resistant casting tip, including the following steps:

stirring magnesia-alumina spinel, alumina, magnesia, water, sodium tripolyphosphate and sodium carboxymethyl cellulose evenly to prepare casting tip paint;

adhering the prepared casting tip paint to the inner wall of the casting tip in a manner of coating, ensuring that the inner wall of the casting tip is entirely covered by the paint;

putting the casting tip coated with the paint into a drying oven for drying; and putting the dried casting tip into a box type furnace for heat treatment to obtain the molten aluminum erosion resistant casting tip.

Preferably, the proportions of raw materials for the casting tip paint are as follows: magnesia-alumina spinel of 40-50 wt %, alumina of 10-20 wt %, magnesia of 5-10 wt %, water of 20-40 wt %, sodium tripolyphosphate of 0-10 wt %, and sodium carboxymethyl cellulose of 0-10 wt %.

Preferably, prior to the step of stirring magnesia-alumina spinel, alumina, magnesia, water, sodium tripolyphosphate and sodium carboxymethyl cellulose evenly to prepare casting tip paint, the preparation method also includes:

performing ball milling on magnesia-alumina spinel, alumina and magnesia, so as to obtain powder.

Preferably, when magnesia-alumina spinel, alumina and magnesia are separately put into the ball mill for performing ball milling, the ball milling time is 1-4 h, and the rotational speed is 350-500 r/min; and magnesia-alumina spinel, alumina and magnesia after being performed ball milling are enabled to pass through a 200-300 mesh screen.

Preferably, magnesia-alumina spinel, alumina, magnesia, water, sodium tripolyphosphate and sodium carboxymethyl cellulose are put into a magnetic stirring apparatus to be stirred for 15-30 min.

Preferably, when the casting tip coated with the paint is put into the drying oven for drying, the drying temperature is 80-100° C., and the drying time is 5-10 h so as to ensure that the water content of the interior of the casting tip does not exceed 5%.

Preferably, when the dried casting tip is put into the box type furnace for heat treatment, the heat treatment temperature is 1200-1450° C., the heating rate is 3-5° C./min, and the reaction time is 8-12 h.

According to the molten aluminum erosion resistant casting tip paint provided by the present disclosure, the casting tip coating solves the problem that the casting tip is prone to be damaged due to molten aluminum erosion, and magnesia-alumina spinel powder with very poor wettability with the molten aluminum is added, so that the problem that the molten aluminum is easily adhered to the interior of the casting tip is solved, and the problem that the cavity of the casting tip is easily blocked is also solved; and the service life of the casting tip can be prolonged, so that the time for replacing the casting tip can be shortened, and the effects of prolonging the production cycle of related enterprises and increasing the production efficiency can be achieved. Production increasing and efficiency increasing of the enterprises are facilitated, and the molten aluminum erosion resistant casting tip paint has an important significance for upgrading and improvement of production process in aluminum industry.

BRIEF DESCRIPTION OF THE DRAWINGS

FIG. 1 is a flow diagram of a preparation method of a molten aluminum erosion resistant casting tip according to the present disclosure.

Achievement of the purpose, functional characteristics and advantages of the present disclosure will be further illustrated in conjunction with the embodiments and with reference to the appended drawings.

DESCRIPTION OF THE EMBODIMENTS

It should be understood that, the specific embodiments described here are merely intended to illustrate the present disclosure, and not to restrict the present disclosure.

The present disclosure provides a molten aluminum erosion resistant casting tip paint.

The molten aluminum erosion resistant casting tip paint is formed by mixing magnesia-alumina spinel, alumina, magnesia, water, sodium tripolyphosphate and sodium carboxymethyl cellulose, wherein the proportions of various raw materials for the casting tip paint are as follows: magnesia-alumina spinel of 40-50 wt %, alumina of 10-20 wt %, magnesia of 5-10 wt %, water of 20-40 wt %, sodium tripolyphosphate of 0-10 wt %, and sodium carboxymethyl cellulose of 0-10 wt %.

Sodium tripolyphosphate is adopted as a dispersing agent due to its good thermal stability, so that the viscosity of the paint can be reduced to increase the flowability of the paint. Sodium carboxymethyl cellulose is adopted as a binding agent due to the fact that sodium carboxymethyl cellulose can increase plasticity to a certain extent, has a water retention function, can increase the strength of a molded body, and can prevent a powder raw material from being coagulated.

The particle size range of magnesia-alumina spinel is 10-100 nm, the particle size range of alumina is 10-100 nm, and the particle size range of magnesia is 10-100 nm.

The preparation method of the casting tip paint includes:

(1) putting magnesia-alumina spinel, alumina and magnesia into a ball mill for performing ball milling with the mass ratio of the ball materials being 1.5:1, the ball milling time being 1-4 h and the rotational speed being 350-500 r/min, and enabling magnesia-alumina spinel, alumina and magnesia after being performed ball milling to pass through a 200-300 mesh screen to obtain the desired powder;

(2) selecting the raw materials according to the following proportion: magnesia-alumina spinel of 40-50 wt %, alumina of 10-20 wt %, magnesia of 5-10 wt %, water of 20-40 wt %, sodium tripolyphosphate of 0-10 wt %, and sodium carboxymethyl cellulose of 0-10 wt %; and (3) putting magnesia-alumina spinel powder, alumina powder, magnesia powder, water, sodium tripolyphosphate serving as a dispersing agent and sodium carboxymethyl cellulose into a magnetic stirring apparatus according to the proportion in the step (2) for stirring for 15-30 min, and stirring evenly to prepare the casting tip paint.

According to the molten aluminum erosion resistant casting tip paint provided by the present disclosure, the casting tip coating solves the problem that the casting tip is prone to be damaged due to molten aluminum erosion, and magnesia-alumina spinel powder with very poor wettability with the molten aluminum is added, so that the problem that the molten aluminum is easily adhered to the interior of the casting tip is solved, and the problem that the cavity of the casting tip is easily blocked is also solved; the service life of the casting tip can be prolonged, so that the time for replacing the casting tip can be shortened, and the effects of prolonging the production cycle of related enterprises and increasing the production efficiency can be achieved. Production increasing and efficiency increasing of the enterprises are facilitated, and the molten aluminum erosion resistant casting tip paint has an important significance for upgrading and improvement of production process in aluminum industry.

The present disclosure further provides a preparation method of a molten aluminum erosion resistant casting tip.

Referring to FIG. 1, a preparation method of a molten aluminum erosion resistant casting tip includes the following steps:

Step S10: stirring magnesia-alumina spinel, alumina, magnesia, water, sodium tripolyphosphate and sodium carboxymethyl cellulose evenly to prepare casting tip paint;

Step S20: adhering the prepared casting tip paint to the inner wall of the casting tip in a manner of coating;

Step S30: putting the casting tip coated with the paint into a drying oven for drying; and Step S40: putting the dried casting tip into a box type furnace for heat treatment to obtain a molten aluminum erosion resistant casting tip.

Further, prior to the step S10, the preparation method also includes:

Step S01: performing ball milling on magnesia-alumina spinel, alumina and magnesia, so as to obtain powder.

In step S01, when magnesia-alumina spinel, alumina and magnesia are separately put into the ball mill for performing ball milling, the ball milling time is 1-4 h, the rotational speed is 350-500 r/min; and magnesia-alumina spinel, alumina and magnesia after being performed ball milling are enabled to pass through a 200-300 mesh screen.

In step S20, the proportions of various raw materials for the casting tip paint are as follows: magnesia-alumina spinel of 40-50 wt %, alumina of 10-20 wt %, magnesia of 5-10 wt %, water of 20-40 wt %, sodium tripolyphosphate of 0-10 wt %, and sodium carboxymethyl cellulose of 0-10 wt %.

Magnesia-alumina spinel powder, alumina powder, magnesia powder, water, sodium tripolyphosphate and sodium carboxymethyl cellulose are put into a magnetic stirring apparatus to be stirred for 15-30 min so as to ensure even stirring.

In step S40, when the casting tip coated with the paint is put into the drying oven for drying, the drying temperature is 80-100° C., and the drying time is 5-10 h so as to ensure that the water content of the interior of the casting tip does not exceed 5%.

In step S50, when the dried casting tip is put into the box type furnace for heat treatment, the heat treatment temperature is 1200-1450° C., the heating rate is 3-5° C./min, and the reaction time is 8-12 h.

The preparation method of the molten aluminum erosion resistant casting tip will be specifically illustrated by the following four specific embodiments.

Embodiment 1

A preparation method of a molten aluminum erosion resistant casting tip includes the following steps:

(1) putting magnesia-alumina spinel, alumina and magnesia into a ball mill for performing ball milling with the mass ratio of the ball materials being 1.5:1, the ball milling time being 1 h and the rotational speed being 500 r/min, and enabling magnesia-alumina spinel, alumina and magnesia after being performed ball milling to pass through a 200-mesh screen to obtain the desired powder;

(2) selecting raw materials according to the following proportion: magnesia-alumina spinel 50 g, alumina 10 g, magnesia 5 g, water 35 g, sodium tripolyphosphate 0.2 g, and sodium carboxymethyl cellulose 0.3 g;

(3) putting magnesia-alumina spinel powder, alumina powder, magnesia powder, water, sodium tripolyphosphate serving as a dispersing agent and sodium carboxymethyl cellulose into a magnetic stirring apparatus according to the proportion in the step (2) for stirring for 30 min, and stirring evenly to prepare casting tip paint;

(4) adhering the prepared casting tip paint to the inner wall of the casting tip in a manner of coating, ensuring that the inner wall of the casting tip is entirely covered by the paint;

(5) putting the casting tip coated with the paint into a drying oven for drying, wherein the drying temperature is 100° C., and the drying time is 8 h so as to ensure that the water content of the interior of the casting tip does not exceed 5%;

(6) putting the dried casting tip into a box type furnace for heat treatment, wherein the heat treatment temperature is 1400° C., the heating rate is 3° C./min, and the treatment time is 10 h, so as to make the coating and the casting tip be well bonded together; and (7) putting the casting tip after heat treatment and an aluminum sheet into a tubular furnace, and making aluminum react with the surface of the casting tip, wherein the reaction temperature is 950° C., and after the temperature is held for 10 h, the aluminum sheet is completely molten, and the surface of the casting tip has no change.

Embodiment 2

A preparation method of a molten aluminum erosion resistant casting tip includes the following steps:

(1) putting magnesia-alumina spinel, alumina and magnesia into a ball mill for performing ball milling with the mass ratio of the ball materials being 1.5:1, the ball milling time being 2 h and the rotational speed being 500 r/min, and enabling magnesia-alumina spinel, alumina and magnesia after being performed ball milling to pass through a 200-mesh screen to obtain the desired powder;

(2) selecting raw materials according to the following proportion: magnesia-alumina spinel 45 g, alumina 2.5 g, magnesia 2.5 g, water 50 g, sodium tripolyphosphate 0.5 g, and sodium carboxymethyl cellulose 0.9 g;

(3) putting magnesia-alumina spinel powder, alumina powder, magnesia powder, water, sodium tripolyphosphate serving as a dispersing agent and sodium carboxymethyl cellulose into a magnetic stirring apparatus according to the proportion in the step (2) for stirring for 30 min, and stirring evenly to prepare casting tip paint;

(4) adhering the prepared casting tip paint to the inner wall of the casting tip in a manner of coating, ensuring that the inner wall of the casting tip is entirely covered by the paint;

(5) putting the casting tip coated with the paint into a drying oven for drying, wherein the drying temperature is 100° C., and the drying time is 8 h so as to ensure that the water content of the interior of the casting tip does not exceed 5%;

(6) putting the dried casting tip into a box type furnace for heat treatment, wherein the heat treatment temperature is 1450° C., the heating rate is 3° C./min, and the treatment time is 12 h so as to make the coating and the casting tip be well bonded together; and (7) putting the casting tip after heat treatment and an aluminum sheet into a tubular furnace, and making aluminum react with the surface of the casting tip, wherein the reaction temperature is 950° C., and after the temperature is held for 10 h, the aluminum sheet is completely molten, and the surface of the casting tip has no change.

Embodiment 3

A preparation method of a molten aluminum erosion resistant casting tip includes the following steps:

(1) putting magnesia-alumina spinel, alumina and magnesia into a ball mill for performing ball milling with the mass ratio of the ball materials being 1.5:1, the ball milling time being 1.5 h and the rotational speed being 500 r/min, and enabling magnesia-alumina spinel, alumina and magnesia after being performed ball milling to pass through a 200-mesh screen to obtain the desired powder;

(2) selecting raw materials according to the following proportion: magnesia-alumina spinel 40 g, alumina 10 g, magnesia 10 g, water 40 g, sodium tripolyphosphate 0.3 g, and sodium carboxymethyl cellulose 0.5 g;

(3) putting magnesia-alumina spinel powder, alumina powder, magnesia powder, water, sodium tripolyphosphate serving as a dispersing agent and sodium carboxymethyl cellulose into a magnetic stirring apparatus according to the proportion in the step (2) for stirring for 30 min, and stirring evenly to prepare casting tip paint;

(4) adhering the prepared casting tip paint to the inner wall of the casting tip in a manner of coating, ensuring that the inner wall of the casting tip is entirely covered by the paint;

(5) putting the casting tip coated with the paint into a drying oven for drying, wherein the drying temperature is 100° C., and the drying time is 8 h so as to ensure that the water content of the interior of the casting tip does not exceed 5%;

(6) putting the dried casting tip into a box type furnace for heat treatment, wherein the heat treatment temperature is 1350° C., the heating rate is 3° C./min, and the treatment time is 9 h, so as to make the coating and the casting tip be well bonded together; and (7) putting the casting tip after heat treatment and the aluminum sheet into a tubular furnace, and making the aluminum react with the surface of the casting tip, wherein the reaction temperature is 950° C., and after the temperature is held for 10 h, the aluminum sheet is completely molten, and the surface of the casting tip has no change.

Embodiment 4

A preparation method of a magnesia-alumina spinel-containing casting tip material includes the following steps:

(1) putting magnesia-alumina spinel, alumina and magnesia into a ball mill for performing ball milling with the mass ratio of the ball materials being 1.5:1, the ball milling time being 1.5 h and the rotational speed being 500 r/min, and enabling magnesia-alumina spinel, alumina and magnesia after being performed ball milling to pass through a 200-mesh screen to obtain the desired powder;

(2) selecting raw materials according to the following ratio: magnesia-alumina spinel 40 g, alumina 10 g, magnesia 10 g and water 40 g; mixing the raw materials, then performing granulation and aging;

(3) pressing pug after the aging into a round sheet with a radius of 20 mm and a thickness of 5 mm by a die, wherein the pressure of a press is 25 KN;

(4) putting the above obtained pressed green body into a drying oven at 100° C. for drying for 6 h;

(5) putting the dried green body into a box type furnace for heat treatment with the heat treatment temperature being 1400° C., the heating rate being 3° C./min and the treatment time being 9 h to obtain a fired green body sample; and (6) putting the fired green body and a pure aluminum sheet into a tubular furnace, and making the aluminum react with the green body, wherein the reaction temperature is 950° C., and the temperature holding time is 10 h.

By analyzing the sample after reaction, when the temperature holding time is 10 h, aluminum substantially does not react with the spinel-containing casting tip material in the tubular furnace, this shows that the casting tip material prepared by using spinel as the main raw material has a good effect.

The above embodiments are merely preferred embodiments of the present disclosure, and are not intended to restrict the patent scope of the present disclosure, the equivalent structure transformations made based on the description and appended drawings of the present disclosure, which are directly or indirectly applied in other related technical fields, are similarly included in the patent protection scope of the present disclosure.

What is claimed is:

1. A molten aluminum erosion resistant casting tip paint, the casting tip paint being formed by mixing raw materials only consisting of magnesia-alumina spinel, alumina, magnesia, water, sodium tripolyphosphate and carboxymethyl cellulose sodium, wherein the proportions of the raw materials for the casting tip paint are as follows: magnesia-alumina spinel of 40-50 wt %, alumina of 10-20 wt %, magnesia of 5-10 wt %, water of 20-40 wt %, sodium tripolyphosphate of greater than 0 wt % to about 0.5 wt %, and carboxymethyl cellulose sodium of greater than 0 wt % to 10 wt %.

2. The molten aluminum erosion resistant casting tip paint according to claim 1, wherein the particle size range of magnesia-alumina spinel is 10-100 nm.

3. The molten aluminum erosion resistant casting tip paint according to claim 1, wherein the particle size range of alumina is 10-100 nm.

4. The molten aluminum erosion resistant casting tip paint according to claim 1, wherein the particle size range of magnesia is 10-100 nm.

* * * * *